United States Patent
Ding et al.

(10) Patent No.: US 11,144,735 B2
(45) Date of Patent: Oct. 12, 2021

(54) SEMANTIC CONCEPT SCORER BASED ON AN ENSEMBLE OF LANGUAGE TRANSLATION MODELS FOR QUESTION ANSWER SYSTEM

(71) Applicant: INTERNATIONAL BUSINESS MACHINES CORPORATION, Armonk, NY (US)

(72) Inventors: Chengmin Ding, Chantilly, VA (US); Octavian F. Filoti, Portsmouth, NH (US); Stanley J. Vernier, Grove City, OH (US); Renee F. Decker, Brunswick, MD (US); Elinna Shek, Loudoun County, VA (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 16/379,593

(22) Filed: Apr. 9, 2019

(65) Prior Publication Data
US 2020/0327198 A1   Oct. 15, 2020

(51) Int. Cl.
*G06F 40/58* (2020.01)
*G06F 16/332* (2019.01)
*G06F 40/30* (2020.01)

(52) U.S. Cl.
CPC .......... *G06F 40/58* (2020.01); *G06F 16/3329* (2019.01); *G06F 40/30* (2020.01)

(58) Field of Classification Search
None
See application file for complete search history.

(56) References Cited

U.S. PATENT DOCUMENTS

| 5,301,109 | A | * | 4/1994 | Landauer | G06F 16/33 704/9 |
|---|---|---|---|---|---|
| 7,139,752 | B2 | | 11/2006 | Broder et al. | |
| 7,475,015 | B2 | | 1/2009 | Epstein et al. | |
| 8,275,803 | B2 | | 9/2012 | Brown et al. | |
| 9,002,857 | B2 | * | 4/2015 | Robinson | G06F 16/24578 707/749 |
| 9,477,654 | B2 | * | 10/2016 | He | G06F 40/30 |

(Continued)

OTHER PUBLICATIONS

Magnini B, Negri M, Prevete R, Tanev H. Multilingual question/answering: the DIOGENE system. InTREC Nov. 2001 (Year: 2001).*

(Continued)

*Primary Examiner* — Jonathan C Kim
(74) *Attorney, Agent, or Firm* — Conley Rose, P.C.

(57) ABSTRACT

A system includes a memory having instructions stored therein. The system also includes at least one processor in communication with the memory. The at least one processor is configured to execute the instructions to receive an input question in a source language, generate a first similarity score based at least in part on a source-language operand, generate a target-language operand based at least in part on the source-language operand, generate a second similarity score based at least in part on the target-language operand, generate a semantic concept score based at least in part on the first similarity score and the second similarity score, generate a set of ranked answers to the input question ("ranked answer set") based at least in part on the semantic concept score, and output the ranked answer set.

20 Claims, 5 Drawing Sheets

(56) References Cited

U.S. PATENT DOCUMENTS

| | | | |
|---|---|---|---|
| 9,519,686 B2 | 12/2016 | Bufe, III et al. | |
| 9,761,225 B2 | 9/2017 | Grandrabur et al. | |
| 10,025,830 B1* | 7/2018 | Thakur | G06F 16/9537 |
| 2002/0002550 A1* | 1/2002 | Berman | G06F 16/24553 |
| 2003/0004716 A1* | 1/2003 | Haigh | G10L 15/10 704/238 |
| 2004/0193401 A1* | 9/2004 | Ringger | G10L 15/26 704/9 |
| 2007/0174040 A1* | 7/2007 | Liu | G06F 40/40 704/2 |
| 2010/0235313 A1* | 9/2010 | Rea | G06F 16/335 706/52 |
| 2011/0125734 A1 | 5/2011 | Duboue et al. | |
| 2011/0202334 A1* | 8/2011 | Abir | G06F 40/55 704/4 |
| 2013/0103681 A1* | 4/2013 | Renders | G06F 16/14 707/728 |
| 2014/0188768 A1 | 7/2014 | Bonissone et al. | |
| 2014/0229163 A1 | 8/2014 | Gliozzo | |
| 2014/0297571 A1 | 10/2014 | Beamon et al. | |
| 2015/0227741 A1 | 8/2015 | Permeh et al. | |
| 2015/0293917 A1 | 10/2015 | Bufe, III et al. | |
| 2015/0356170 A1 | 12/2015 | Allen et al. | |
| 2016/0179945 A1* | 6/2016 | Lastra Diaz | G06F 16/3334 707/739 |
| 2016/0247061 A1* | 8/2016 | Trask | G06N 3/04 |
| 2016/0292145 A1* | 10/2016 | Azzi | G06F 40/211 |
| 2017/0083510 A1* | 3/2017 | Dixon | G06F 40/47 |
| 2018/0107648 A1* | 4/2018 | Ackermann | G06F 40/295 |
| 2018/0314689 A1* | 11/2018 | Wang | G10L 15/07 |
| 2020/0193153 A1* | 6/2020 | Lee | G06F 40/226 |
| 2020/0327198 A1* | 10/2020 | Ding | G06F 40/30 |

OTHER PUBLICATIONS

Bond F, Foster R. Linking and extending an open multilingual wordnet. InProceedings of the 51st Annual Meeting of the Association for Computational Linguistics (vol. 1: Long Papers) Aug. 2013 (pp. 1352-1362). (Year: 2013).*

Clough, Paul, and Mark Stevenson. "Cross-language information retrieval using EuroWord Net and word sense disambiguation." European Conference on Information Retrieval. Springer, Berlin, Heidelberg, 2004. (Year: 2004).*

Lai, Alice, and Julia Hockenmaier. "Illinois-LH: A Denotational and Distributional Approach to Semantics." SemEval@ COLING. 2014. (Year: 2014).*

Kim, Mi-Young, Ying Xu, and Randy Goebel. "Legal question answering using ranking svm and syntactic/semantic similarity." JSAI International Symposium on Artificial Intelligence. Springer, Berlin, Heidelberg, 2014. (Year: 2014).*

Grycner, Adam, and Gerhard Weikum. "Poly: Mining relational paraphrases from multilingual sentences." Proceedings of the 2016 Conference on Empirical Methods in Natural Language Processing. 2016. (Year: 2016).*

Navigli, Roberto, and Simone Paolo Ponzetto. "BabelNet: Building a very large multilingual semantic network." Proceedings of the 48th annual meeting of the association for computational linguistics. 2010. (Year: 2010).*

Ion, Radu, and Dan Tufis. "Multilingual word sense disambiguation using aligned wordnets." Romanian Journal of Information Science and Technology 7.1-2 (2004): 183-200. (Year: 2004).*

Moussa, Abdullah M., and Rehab F. Abdel-Kader. "Qasyo: A question answering system for yago ontology." International Journal of Database Theory and Application 4.2 (2011): 99-112. (Year: 2011).*

Bouma, Gosse, Ismail Fahmi, and Jori Mur. "Relation extraction for open and closed domain question answering." Interactive Multimodal Question-Answering. Springer, Berlin, Heidelberg, 2011. 171-197. (Year: 2011).*

Volk, Martin, et al. "Semantic annotation for concept-based cross-language medical information retrieval." International Journal of Medical Informatics 67.1-3 (2002): 97-112. (Year: 2002).*

Li, Sujian, et al. "Semantic computation in a Chinese question-answering system." Journal of Computer Science and Technology 17.6 (2002): 933-939. (Year: 2002).*

Cer, Daniel, et al. "Semeval-2017 task 1: Semantic textual similarity-multilingual and cross-lingual focused evaluation." arXiv preprint arXiv: 1708.00055 (2017). (Year: 2017).*

Molino, "Semantic Models for Answer Re-Ranking in Question Answering," Conference Paper, SIGIR 2013, https://www.researchgate.net/publication/253953301, Jul. 2013, 17 pages.

"API-Documentation," GitHub—MerriamO/api-documentation: Merriam.IO Client Library for Rest API's, https://github.com/MerriamlO/api-documentation, Jan. 30, 2019, 13 pages.

"Curl," Language Translator—IBM Cloud API Docs, https://cloud/ibm.com/apidocs/language-translator, Jan. 39, 2019, 24 pages.

"IBM Watson Language Translator API / Programmable," https://www.programmableweb.com/api/ibm-watson-language-translator, Jan. 30, 2019, 6 pages.

"Category: Translation: 151 Translation APIs / Programmable," https://www.programmableweb.com/category/translations/api, Jan. 30, 2019, 5 pages.

Brown, et al., "A Statistical Approach to Machine Translation," Computational Linguistics vol. 16, No. 2, Jun. 1990, pp. 79-84.

Mahabal, et al., "Robust Handling of Polysemy via Sparse Representations," *SEM 2018, 11 pages.

McCord, et al., "Deep Parsing in Watson," IBM J. RES. & DEV. vol. 56 No. 3/4 Paper 3 May/July 2012, pp. 3:1-3:15.

Berger, et al., "Bridging the Lexical Chasm: Statistical Approaches to Answer-Finding," 8 pages.

"Lightweight Ontologies—Semantic Matching," http://semanticmatching.eu/lightweight-ontologies.html, Jan. 8, 2019, 1 page.

"Semantic Matching," http://semanticmatching.eu/semantic-matching.html, Jan. 8, 2019, 1 page.

"Semantic Matching," Wikipedia, https://en.wikipedia.org/wiki/Semantic_matching, Retrieved Dec. 21, 2018, pp. 1-2.

Zorfass, et al., "Connecting Word Meanings Through Semantic Mapping," Connecting Word Meanings Through Semantic Mapping/LD Topical/LD Online, http://www.Idonline.org/article/61474/, Jan. 8, 2019, 4 pages.

"Structure Mapping Engine," Wikipedia, https://en.wikipeida.org/wiki/Structure_mapping_engine, Jan. 8, 2019, 6 pages.

Fodeh, et al., "Combining Statistics and Semantics via Ensemble Model for Document Clustering," SAC '09, Mar. 8-12, 2009, 2009 ACM, 5 pages.

Wan, "Using Bilingual Knowledge and Ensemble Techniques for Unsupervised Chinese Sentiment Analysis," Proceedings of the 2008 Conference on Empirical Methods in Natural Language Processing, pp. 553-561, Honolulu, Oct. 2008. c 2008 Association for Computational Linguistics, pp. 553-561.

* cited by examiner

SEMANTIC CONCEPT SCORER BASED ON AN ENSEMBLE OF LANGUAGE TRANSLATION MODELS FOR QUESTION ANSWER SYSTEM

BACKGROUND

A question answering ("QA") system is, generally, a computer application which mines one or more knowledge bases in order to answer questions. The present disclosure provides embodiments for use in a QA system such as, but not limited to, the IBM Watson® QA system.

SUMMARY

A method is disclosed. The method includes receiving an input question in a source language, generating a first similarity score based at least in part on a source-language operand, generating a target-language operand based at least in part on the source-language operand, generating a second similarity score based at least in part on the target-language operand, generating a semantic concept score based at least in part on the first similarity score and the second similarity score, generating a set of ranked answers to the input question ("ranked answer set") based at least in part on the semantic concept score, and outputting the ranked answer set.

A system is also disclosed. The system includes a memory having instructions stored therein. The system also includes at least one processor in communication with the memory. The at least one processor is configured to execute the instructions to receive an input question in a source language, generate a first similarity score based at least in part on a source-language operand, generate a target-language operand based at least in part on the source-language operand, generate a second similarity score based at least in part on the target-language operand, generate a semantic concept score based at least in part on the first similarity score and the second similarity score, generate a set of ranked answers to the input question ("ranked answer set") based at least in part on the semantic concept score, and output the ranked answer set.

A computer program product is also disclosed. The computer program product includes a computer readable storage medium having program instructions embodied therewith. The program instructions are executable by at least one processor to cause the at least one processor to receive an input question in a source language, generate a first similarity score based at least in part on a source-language operand, generate a target-language operand based at least in part on the source-language operand, generate a second similarity score based at least in part on the target-language operand, generate a semantic concept score based at least in part on the first similarity score and the second similarity score, generate a set of ranked answers to the input question ("ranked answer set") based at least in part on the semantic concept score, and output the ranked answer set.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to." Unless otherwise indicated, as used throughout this document, "or" does not require mutual exclusivity, and the singular forms "a," "an," and "the" are intended to include the plural forms as well, unless the context clearly indicates otherwise.

A "module" or "unit" as referenced herein comprises one or more hardware or electrical components such as electrical circuitry, processors, and memory that may be specially configured to perform a particular function. The memory may comprise volatile memory or non-volatile memory that stores data such as, but not limited to, computer executable instructions, machine code, and other various forms of data. The module or unit may be configured to use the data to execute one or more instructions to perform one or more tasks. In certain instances, a module or unit may also refer to a particular set of functions, software instructions, or circuitry that is configured to perform a specific task. For example, a module or unit may comprise software components such as, but not limited to, data access objects, service components, user interface components, application programming interface ("API") components; hardware components such as electrical circuitry, processors, and memory; and/or a combination thereof. As referenced herein, computer executable instructions may be in any form including, but not limited to, machine code, assembly code, and high-level programming code written in any programming language.

Also, as used herein, the term "communicate" and inflections thereof mean to send and/or receive data over a communication link. The communication link may include both wired and wireless links, and may comprise a direct link or may comprise multiple links passing through one or more communication networks or network devices such as, but not limited to, routers, firewalls, servers, and switches. The communication networks may comprise any type of wired or wireless network. The networks may include private networks and/or public networks such as the Internet. Additionally, in some embodiments, the term communicate may also encompass internal communication between various components of a system and/or with an external input/output device such as a keyboard or display device.

As referenced herein, a "knowledge graph" is, generally, a representation of a domain of knowledge that is based on a graph data structure with nodes and edges that link related data such as facts, people, and places together.

As referenced herein, a "question domain" is a domain of knowledge that a QA system may access and examine to answer an input question.

As referenced herein, a "candidate-answers set" is a set of one or more candidate answers to the input question, an "evidence set" is a set of one or more "evidence passages," and an "evidence passage" is one or more words, phrases, text passages, and/or other items of information and/or data that provides evidence that supports the veracity of the candidate-answers set.

As referenced herein, a "candidate-answers-scores set" is a set of one or more candidate-answer scores, and a "candidate-answer score" is a value reflecting a rating or grade of a candidate answer pursuant to a particular assessment technique. For example, the IBM Watson® QA system employs more than 50 candidate-answer-scoring components that generate candidate-answer scores ranging from formal probabilities to counts to categorical features, based on evidence from different types of sources including unstructured text, semi-structured text, and triple stores. These candidate-answer scorers consider various factors including, but not limited to, the degree of match between a passage's predicate-argument structure ("PAS") and the question, passage source reliability, geospatial location, temporal relationships, taxonomic classification, the lexical and semantic relations the candidate is known to participate in, the candidate's correlation with question terms, its popularity (or obscurity), and its aliases.

In some question domains, the best answer to a question may represent a concept that does not follow the traditional lexicon or grammar. For example, "motor the engine" can represent a pilot action in a spaceflight question domain. Even adding "motor the engine" as a specific entry to the lexicon of such a question domain may not address this issue as effectively as desired, as the lexical-based candidate-answer scores could still come out too low relative to other scores. Aspects of the present disclosure provide a candidate-answer-scoring approach that focuses more on question domain concepts that might be present across multiple languages than language-specific lexical representations, and that prioritizes such concepts higher in the final answer scoring, such that valuable question domain specific concepts may rank higher in the candidate-answers set than they otherwise would, which can make QA system question domain adaptation more effective. Rather than heavily relying on a word-embedding model to map terms/concepts to a relatively high-dimensional feature matrix, aspects of the present disclosure leverage language translation models to allow for multiple, relatively lower-dimensional, and substantially non-lexical (i.e., "language-neutral") techniques (e.g., logical form pattern matching, PAS, bag of words, etc.)—alone or in combination with some language-specific techniques that may be particularly well-suited for some languages or domains—to generate language-specific semantic matching answer scores. Aspects of the present disclosure also employ a machine learning model to aggregate the concepts scores from the different languages to ameliorate language-specific lexical bias, such that the resulting semantic concept score is based more on the underlying semantic concept than lexical or syntactical level matching.

Figure 1:
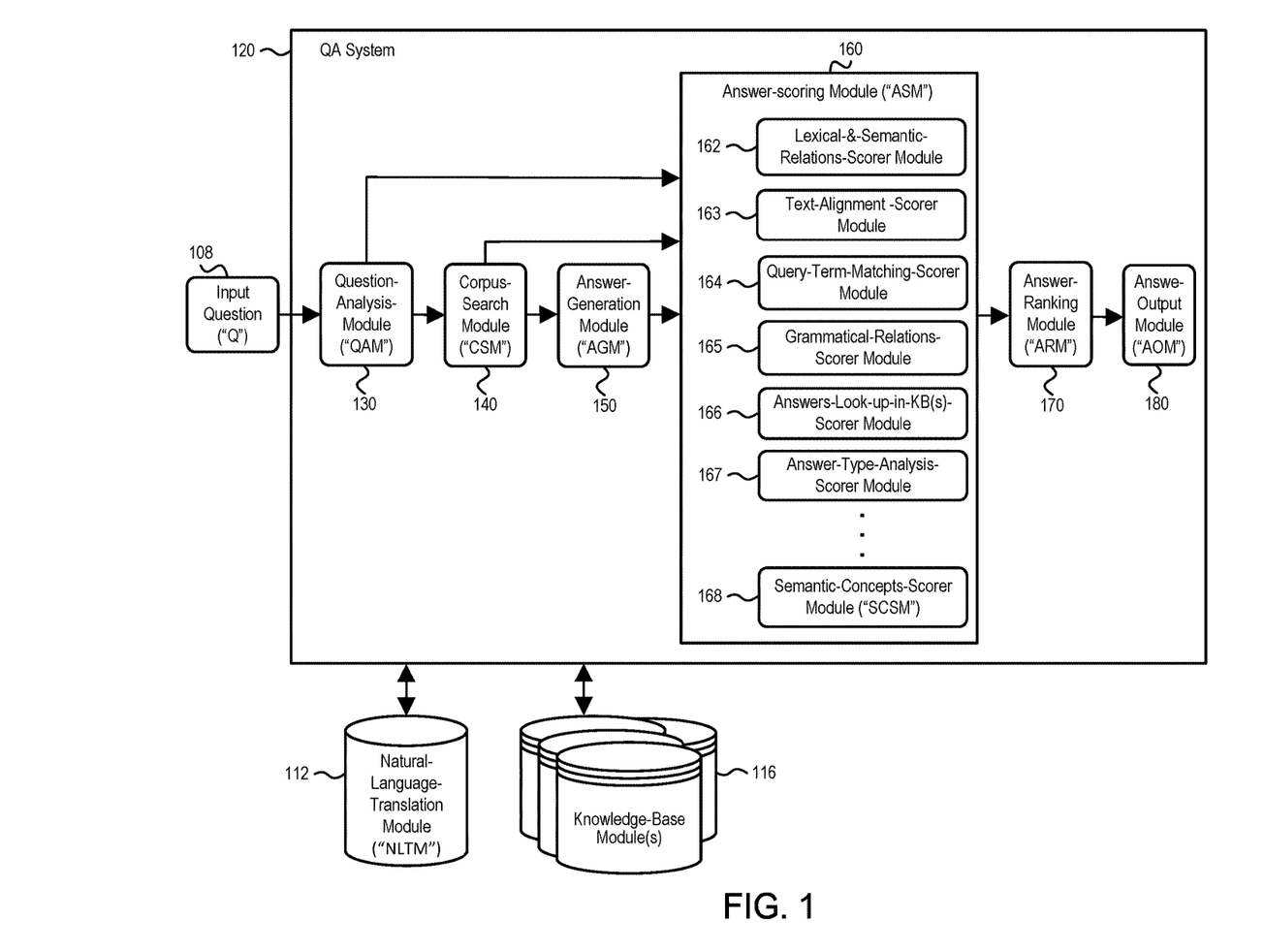
FIG. 1 is a block diagram illustrating an input question, a natural-language-translation module, one or more knowledge-base modules, and a QA system in accordance with aspects of the present disclosure.

FIG. 1 is a block diagram illustrating an input question ("Q") 108, a natural-language-translation module ("NLTM") 112, one or more knowledge-base modules 116, and a QA system 120 in accordance with aspects of the present disclosure. The NLTM 112 is configured to translate information from a first natural language ("source language") into a second natural language ("target language"). The NLTM 112 comprises the IBM Watson™ Language Translator, which has been made available (through an API) by International Business Machines Corporation. The IBM Watson™ Language Translator API has been made available at https://cloud.ibm.com/apidocs/language-translator. The IBM Watson™ Language Translator may be customized by question domain (i.e., by topic or subject matter, such as, for example, engineering, weather, sports, etc.) to improve its efficacy. In some embodiments, the NLTM 112 may comprise Merriam.IO, which has been promoted as "a Translation and Language Detection Cloud API based on Google Translate." The Merriam.IO API has been made available at https://github.com/MerriamIO/api-documentation. In any event, the NLTM 112 may comprise any suitable natural language processing machine translation model, including but not limited to any suitable neural machine translation model, any suitable statistical machine translation model, any suitable rule-based machine translation model, any suitable example-based machine translation model, or any suitable combination thereof.

Each of the one or more knowledge-base modules 116 comprises one or more knowledge bases that may include one or more knowledge graphs and information from one or more corpora of documents such as, but not limited to, publications, books, magazines, articles, research papers, online content, and other data. In some embodiments, the one or more knowledge bases may comprise the IBM Watson™ Discovery Knowledge Graph, which has been made available at https://cloud.ibm.com/docs/services/discovery?topic=discovery-kg#kg. In some embodiments, the one or more knowledge bases may comprise the YAGO™ knowledge base, which has been a joint project of the Max Planck Institute for Informatics and the Telecom ParisTech University. The YAGO™ knowledge base has been made available at https://www.mpi-inf.mpg.de/departments/databases-and-information-systems/research/yago-naga/yago/. In some embodiments, the one or more knowledge bases may comprise the Google® Knowledge Graph, which has been made available (through an API) by Google. The Google® Knowledge Graph Search API has been made available at https://developers.google.com/knowledge-graph/. In any event, the one or more knowledge-base modules 116 may comprise any suitable one or more knowledge bases or any suitable combination thereof.

The QA system 120 is communicatively coupled to the NLTM 112 and the one or more knowledge-base modules 116. The QA system 120 is, generally, configured to mine one or more knowledge bases in order to provide one or more answers to the input question 108. Some embodiments of the QA system 120 may include one or more ingestion pipelines (not shown) configured to extract information from input documents and configured to use the extracted information to generate the knowledge base(s). The input documents may include unstructured data (e.g., freeform text), structured data such as table data, and/or one or more graphical representations of data. Such embodiments of the QA system 120 may be configured to obtain the input documents from one or more document training databases, publicly available online sources, and/or various other sources. Some embodiments of the QA system 120 may be configured to obtain the knowledge base(s) by downloading or copying one or more previously generated knowledge bases into the one or more knowledge-base modules 116. Some embodiments of the QA system 120 may be configured to communicate with one or more external computers, machines, modules, and/or devices to access the knowledge base(s) from the one or more knowledge-base modules 116 over a communication link.

The QA system 120 includes a question-analysis module ("QAM") 130. The QAM 130 is configured to receive the input question 108 and use the NLTM 112, the one or more knowledge-base modules 116, natural language processing ("NLP"), natural language understanding ("NLU"), and/or other suitable devices and/or techniques to provide the input question 108 and/or suitable data and/or information about the input question 108 to one or more other components of the QA system 120 in accordance with aspects of the present disclosure. The QAM 130 is also configured to, among other things, determine a question domain ("D"). In some embodiments, the QA system 120 may be configured such that the question domain, D, is manually selectable or otherwise suppliable by a user during operations of the QA system 120. In some embodiments, the QA system 120 may be configured such that the question domain, D, may be pre-assigned (e.g., by developer). The QAM 130 also determines (using the NLTM 112) the natural language in which the QA system 120 has received the input question 108, which, in accordance with aspects of the present disclosure, is the source language of the input question 108. In some embodiments, the QAM 130 may be configured to receive the input question 108 as a textual expression and/or in a form representative of a textual expression. In some embodiments, the QAM 130 may be configured to receive the input question 108 as a spoken expression and/or in a form representative of a spoken expression. As referenced herein, "source-language" (where used as an adjective or other term of modification or classification) means expressed in the source language of the input question 108 or in a form representative of the source language of the input question 108, whereas "target-language" (where used as an adjective or other term of modification or classification) means expressed in a target language or in a form representative of the target language.

The QA system 120 also includes a corpus-search module ("CSM") 140. The CSM 140 is communicatively coupled to the QAM 130 and the one or more knowledge-base modules 116. The CSM 140 is configured to access the one or more knowledge-base modules 116, to mine the one or more knowledge-base modules 116 to find (within the question domain, D) a source-language evidence set ("E"), and to provide the source-language evidence set, E, and/or suitable data and/or information about the source-language evidence set, E, to one or more other components of the QA system 120 in accordance with aspects of the present disclosure.

The QA system 120 also includes an answer-generation module ("AGM") 150. The AGM 150 is communicatively coupled to the CSM 140 and the one or more knowledge-base modules 116. The AGM 150 is configured to generate a source-language candidate-answers set ("A") and to provide the source-language candidate-answers set, A, and/or suitable data and/or information about the source-language candidate-answers set to one or more other components of the QA system 120 in accordance with aspects of the present disclosure.

The QA system 120 also includes an answer-scoring module ("ASM") 160. The ASM 160 is communicatively coupled to the QAM 130, the CSM 140, the AGM 150, the NLTM 112, and the one or more knowledge-base modules 116. The ASM 160 is configured to generate a candidate-answers-scores set and to provide the candidate-answers-scores set and/or suitable data and/or information about the candidate-answers-scores set to one or more other components of the QA system 120 in accordance with aspects of the present disclosure. The ASM 160 includes: a lexical-&-semantic-relations-scorer module 162 (configured to generate a lexical & semantic relations candidate-answer score based on how well semantic (predicate/argument) relations in one or more evidence passages are satisfied); a text-alignment-scorer module 163 (configured to generate a text alignment candidate-answer score based on a degree of alignment between the input question 108 (or a portion thereof) and one or more evidence passages); a query-term-matching-score module 164 (configured to generate a query term matching candidate-answer score based on how well one or more terms in the input question 108 match to one or more terms in the candidate answers); a grammatical-relations-scorer module 165 (configured to generate a grammatical relations candidate-answer score based on grammatical relations among candidate answers) (which, in some embodiments, may be subsumed in the lexical-&-semantic-relations scorer module 162); an answer-look-up-in-KB(s)-scorer module 166 (configured to generate an answer-look-up-in-KB(s) candidate-answer score based on one or more detections of candidate answers in one or more knowledge bases); and an answer-type-analysis-scorer module 167 (configured to generate an answer-type-analysis candidate-answer score based on a probability measure that a candidate answer is of the correct type according to, for example, a grammatical and semantic analysis of the source document in which the corresponding evidence passage(s) appear(s)). The ASM 160 also includes a semantic-concepts-scorer module ("SCSM") 168 in accordance with aspects of the present disclosure. The ASM 160 (including the SCSM 168) is described further below (see, e.g., FIG. 2).

The QA system 120 also includes an answer-ranking module ("ARM") 170. The ARM 170 is communicatively coupled to the ASM 160. The ARM 170 is configured to rank each candidate answer ("$A_{(a)}$") of the source-language candidate-answers set, A (where a=1 to n, and where n is the number of candidate answers in A), relative to each of the other candidate answers of the source-language candidate-answers set, A, based on the respective corresponding candidate-answers-score for each corresponding candidate answer. The ARM 170 is also configured to provide the results of the ranking (referenced herein as a "set of ranked answers to the input question," a "ranked answer set," and/or a "RAS") and/or to provide suitable data and/or information about the RAS to one or more other components of the QA system 120 in accordance with aspects of the present disclosure. In some embodiments, the ARM 170 may be configured to determine (based on the ranking) a single, best-candidate answer to the input question 108 and to provide that best-candidate answer in addition to or in lieu of the RAS. In some embodiments, the ARM 170 may also be configured to generate and provide an estimate of a confidence (e.g., a confidence score/percentage) that the best-candidate answer is correct.

The QA system 120 also includes an answer-output module ("AOM") 180. The AOM 180 is communicatively coupled to the ARM 170. The AOM 180 is configured to suitably output the RAS. In some embodiments, the AOM 180 may be configured to display or otherwise express the RAS in a human-readable natural-language form or other visually intelligible form. In some embodiments, the AOM 180 may be configured to speak or otherwise express the ranked answer set RAS in a human-audible natural-language form or other audibly intelligible form. In some embodiments, the AOM 180 may be configured to communicate the RAS to one or more external computers, machines, modules, and/or devices. In some embodiments, the AOM 180 may also be configured to suitably output the best-candidate answer and/or the confidence score/percentage or other estimate of the confidence that the best-candidate answer is correct to a user and/or to one or more external computers, machines, modules, and/or devices.

Figure 2:
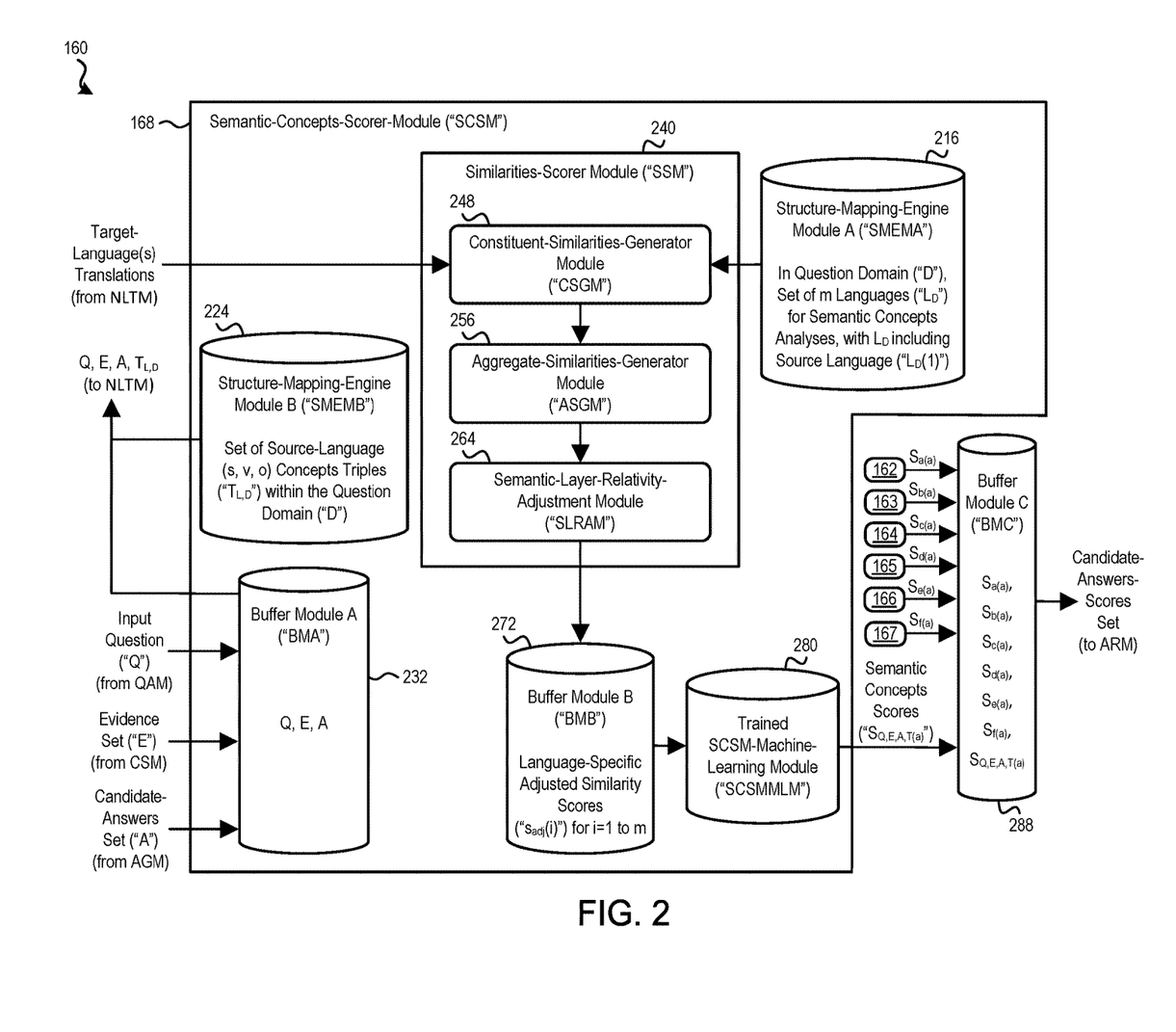
FIG. 2 is a block diagram further illustrating an answer-scoring module (including a semantic-concepts-scorer module) (see also FIG. 1) in accordance with aspects of the present disclosure.

FIG. 2 is a block diagram further illustrating the ASM 160 (including the SCSM 168) (see also FIG. 1) in accordance with aspects of the present disclosure. The SCSM 168 is configured to generate a semantic concept score ("$S_{Q,E,A,T(a)}$") for each corresponding candidate answer, $A_{(a)}$, of the source-language candidate-answers set, A (where a=1 to n, and where n is the number of candidate answers in A) and to provide each $S_{Q,E,A,T(a)}$ and/or suitable data and/or information about the $S_{Q,E,A,T(a)}$ to one or more other components of the QA system 120 in accordance with aspects of the present disclosure. The SCSM 168 includes a structure-mapping-engine module A ("SMEMA") 216. The SMEMA 216 is configured to use structure mapping techniques to determine a set ("$L_D$") of a number ("m") of two or more natural languages ("$L_D(i)$") (where i corresponds to i-th natural language, $L_D(i)$, of the set, $L_D$, of m natural languages) that have suitably similar language constructs and/or other suitably similar features in the question domain, D, for semantic concepts analyses in the question domain, D, with $L_D$ including the source language ("$L_D(1)$") of the input question 108. In some embodiments, the SMEMA 216 may comprise one or more external computers, machines, modules, and/or devices. In some embodiments, the SMEMA 216 may be omitted, with $L_D$ instead being suitably determined by a linguist and/or other developer.

The SCSM 168 also includes a structure-mapping-engine module B ("SMEMB") 224. The SMEMB 224 is configured to use structure mapping techniques to generate a set of one or more source-language subject-verb-object ("s, v, o") concepts triples ("$T_{L,D}$") within the question domain, D. For example, for an English-language input question 108, the source language, $L_D(1)$, would be English, and a language concepts triples set within the spaceflight domain ("$T_{English,Spaceflight}$") might include "pilot, motor, engine" as a first concept triple, $T_{English,Spaceflight}(1)$, which might be associated with a concept of starting a rocket engine. Expanding the example a bit, $T_{English,Spaceflight}$ might also include "we, copy, that" as a second concept triple, $T_{English,Spaceflight}(2)$, which might be associated with a concept of receiving a radio transmission. As another example, for a French-language input question 108, the source language, $L_D(1)$, would be French, and a language concepts triples set within the auto racing question domain ("$T_{French,AutoRacing}$") might include "ce, est, guerre" as a concept triple, $T_{French,AutoRacing}(1)$, which might be associated with a concept of unexpected mechanical failure. In some embodiments, the SMEMB 224 may comprise one or more external computers, machines, modules, and/or devices. In some embodiments, the SMEMB 224 may be omitted, with $T_{L,D}$ instead being manually determined by a linguist and/or other developer.

The SCSM 168 also includes a buffer module A ("BMA") 232. The BMA 232 is communicatively coupled to the QAM 130, the CSM 140, the AGM 150, and the NLTM 112. The BMA 232 is configured to store the input question 108 and/or suitable data and/or information about the input question 108, the source-language evidence set, E, and/or suitable data and/or information about the source-language evidence set, E, and the source-language candidate-answers set, A, and/or suitable data and/or information about the source-language candidate-answers set, A, while the SCSM 168 communicates these things from the QAM 130, the CSM 140, and the AGM 150, respectively, to the NLTM 112.

The SCSM 168 also includes a similarities-scorer module ("SSM") 240. The SSM 240 includes a constituent-similarities-generator module ("CSGM") 248. The CSGM 248 is communicatively coupled to the NLTM 112 and the SMEMA 216. The CSGM 248 is configured to generate, for each candidate answer, $A_{(a)}$, of the source-language candidate-answers set, A, one or more pluralities of constituent similarity scores ("c(1)," "c(2)," and "c(3)") such that $c(1)=\Phi(A_{(a)}(i)Q(i))$, $c(2)=\Phi(A_{(a)}(i)E_{(a)}(i))$, and $c(3)=\Phi(A_{(a)}(i)T_{L,D}(i))$, where $\Phi$ comprises suitable language-neutral similarity score operations and/or function(s) (e.g., logical form pattern matching, PAS, and/or bag of words, etc.), and where i corresponds to the i-th natural language, $L_D(i)$, of the set, $L_D$, of m natural languages.

The SSM 240 also includes an aggregate-similarities-generator module ("ASGM") 256. The ASGM 256 is communicatively coupled to the CSGM 248. The ASGM 256 is configured to generate one or more aggregate similarity scores ("$S_{aggr}(i)$") such that $S_{aggr}(i)=f_{aggr}(c(1),c(2),c(3))$, where $f_{aggr}(y(1),y(2), \ldots y(p))=\Sigma_{k=1}^{P}y(k)$, and where i corresponds to the i-th natural language, $L_D(i)$, of the set, $L_D$, of m natural languages. In other words, the ASGM 256 is configured to generate each sum of each plurality of constituent similarity scores.

The SSM 240 also includes a semantic-layer-relativity-adjustment module ("SLRAM") 264. The SLRAM 264 is communicatively coupled to the ASGM 256. The SLRAM 264 is configured to generate one or more adjusted similarity scores ("$S_{adj}(i)$") by applying an adjustment factor ("$\lambda$") to each of the one or more aggregate similarity scores, $s_{aggr}(i)$, such that $s_{adj}(i)=\lambda*s_{aggr}(i)$, where $\lambda$ is an empirical factor that will suitably effectively adjust the significance (i.e., the weight) of the $S_{Q,E,A,T(a)}$ relative to the other respective answer scores ("$S_{a(a)}$," "$S_{b(a)}$," ... "$S_{f(a)}$") generated by the ASM 160 (see, e.g., FIG. 1 and FIG. 2), and where i corresponds to the i-th natural language, $L_D(i)$, of the set, $L_D$, of m natural languages. In some embodiments, $\lambda$ may be based at least in part on the question domain ("D"). For example, it may be determined automatically or manually that the $S_{Q,E,A,T(a)}$ is or should be highly reliable and/or highly relevant in a particular question domain. In such a case, $\lambda$ may be changed and/or set to a relatively high value to raise the significance of the $S_{Q,E,A,T(a)}$ relative to the other respective answer scores. Alternatively, it may be determined automatically or manually that the $S_{Q,E,A,T(a)}$ is or should be less reliable and/or less relevant in a particular question domain. In such a case, $\lambda$ may be changed and/or set to a lower value to reduce the significance of the $S_{Q,E,A,T(a)}$ relative to the other respective answer scores.

The SCSM 168 also includes a buffer module B ("BMB") 272. The BMB 272 is communicatively coupled to the SLRAM 264. The BMB 272 is configured to store the one or more adjusted similarity scores, $s_{adj}(i)$, as the SLRAM 264 generates them and while the SCSM 168 communicates them to one or more other components in accordance with aspects of the present disclosure.

The SCSM 168 also includes a trained SCSM-machine-learning module ("SCSMMLM") 280. The SCSMMLM 280 is communicatively coupled to the BMB 272. The SCSM-MLM 280 is configured to use a machine learning model to generate each semantic concept score, $S_{Q,E,A,T(a)}$, such that $S_{Q,E,A,T(a)} = f_{ML}(S_{adj}(1), S_{adj}(2), \ldots s_{adj}(m))$, where $f_{ML}(z(1), z(2), \ldots z(m)) = \Sigma_{i=1}^{m} w(i) * z(i)$, where $w(i)$ are machine learning model weights in $(0,1)$, and where i corresponds to the i-th natural language, $L_D(i)$, of the set, $L_D$, of m natural languages. The machine learning model aggregates the m adjusted similarity scores (which are based on the m different languages) and ameliorates language-specific lexical bias, such that the resulting semantic concept score is based more on the underlying semantic concept than lexical or syntactical level matching. In some embodiments, the machine learning model weights, $w(i)$, may be trainable during an overall QA system training phase.

The ASM 160 also includes a buffer module C ("BMC") 288. The BMC 288 is communicatively coupled to the lexical-&-semantic-relations-scorer module 162, the text-alignment-scorer module 163, the query-term-matching-score module 164, the grammatical-relations-scorer module 165, the answer-look-up-in-KB(s)-scorer module 166, the answer-type-analysis-scorer module 167, and the SCSM-MLM 280. The BMC 288 is configured to store each semantic concept score, $S_{Q,E,A,T(a)}$, and the other respective answer scores as they are generated and while the SCSM 168 communicates them to the ARM 170.

Figure 3:
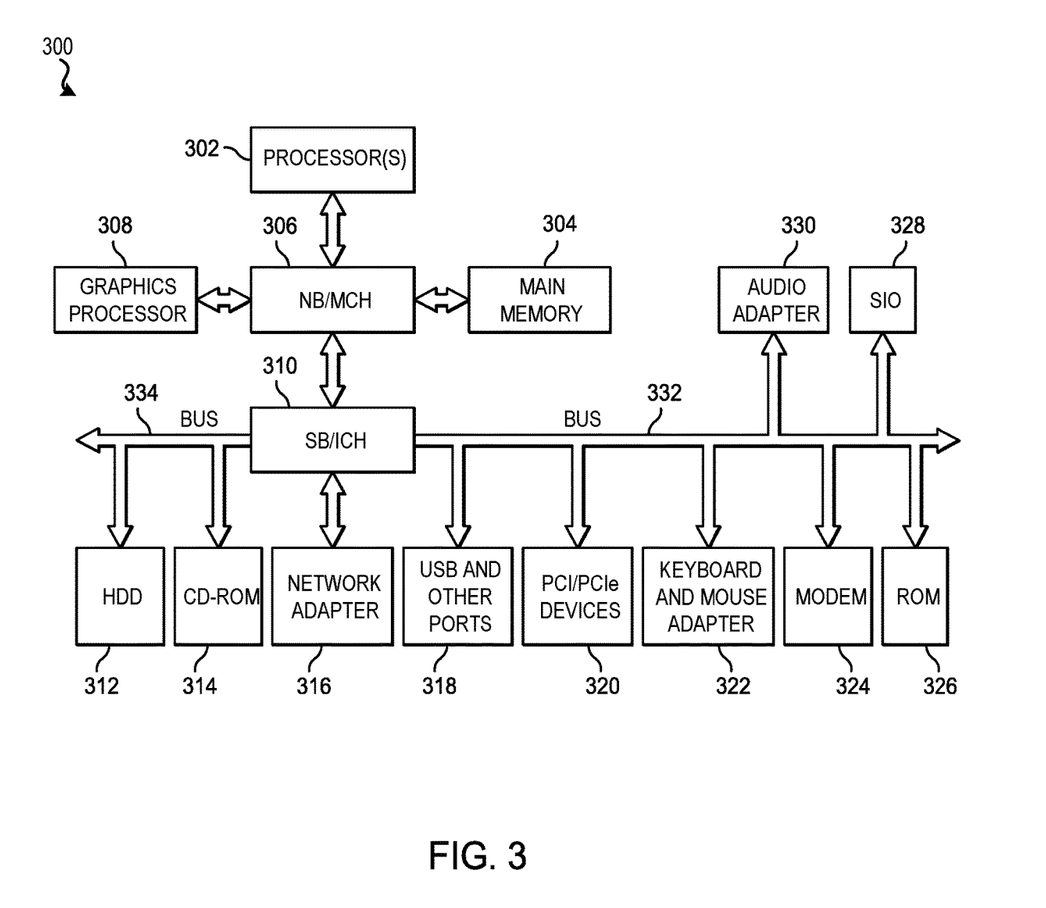
FIG. 3 is a block diagram illustrating a hardware architecture of a data processing system in accordance with aspects of the present disclosure.

FIG. 3 is a block diagram illustrating a hardware architecture of a data processing system 300 in accordance with aspects of the present disclosure. The QA system 120 (see, e.g. FIG. 1) may be implemented using the data processing system 300. Additionally, the data processing system 300 may be configured to store and execute instructions for performing the method 400 (see, e.g. FIG. 4), including step 464 (see, e.g. FIG. 4 and FIG. 5), as well as any other processes described herein. The data processing system 300 employs a hub architecture including north bridge and memory controller hub ("NB/MCH") 306 and south bridge and input/output ("I/O") controller hub ("SB/ICH") 310. Processor(s) 302, main memory 304, and graphics processor 308 are connected to NB/MCH 306. Graphics processor 308 may be connected to NB/MCH 306 through an accelerated graphics port ("AGP"). A computer bus, such as bus 332 or bus 334, may be implemented using any type of communication fabric or architecture that provides for a transfer of data between different components or devices attached to the fabric or architecture.

Network adapter 316 connects to SB/ICH 310. Audio adapter 330, keyboard and mouse adapter 322, modem 324, read-only memory ("ROM") 326, hard disk drive ("HDD") 312, compact disk read-only memory ("CD-ROM") drive 314, universal serial bus ("USB") ports and other communication ports 318, and peripheral component interconnect/peripheral component interconnect express ("PCI/PCIe") devices 320 connect to SB/ICH 310 through bus 332 and bus 334. PCI/PCIe devices may include, for example, Ethernet adapters, add-in cards, and personal computing ("PC") cards for notebook computers. PCI uses a card bus controller, while PCIe does not. ROM 326 may comprise, for example, a flash basic input/output system ("BIOS"). Modem 324 or network adapter 316 may be used to transmit and receive data over a network.

HDD 312 and CD-ROM drive 314 connect to SB/ICH 310 through bus 334. HDD 312 and CD-ROM drive 314 may use, for example, an integrated drive electronics ("IDE") or serial advanced technology attachment ("SATA") interface. In accordance with aspects of the present disclosure, HDD 312 may be replaced by other forms of data storage devices including, but not limited to, solid-state drives ("SSDs"). A super I/O ("SIO") device 328 may be connected to SB/ICH 310. SIO device 328 may comprise a chip on the motherboard that is configured to assist in performing less demanding controller functions for the SB/ICH 310 such as controlling a printer port, controlling a fan, and/or controlling the small light emitting diodes ("LEDS") of the data processing system 300.

The data processing system 300 may include a single processor 302 or may include a plurality of processors 302. Additionally, processor(s) 302 may have multiple cores. In accordance with aspects of the present disclosure, data processing system 300 may employ a large number of processors 302 that include hundreds or thousands of processor cores. In accordance with aspects of the present disclosure, the processors 302 may be configured to perform a set of coordinated computations in parallel.

An operating system is executed on the data processing system 300 using the processor(s) 302. The operating system coordinates and provides control of various components within the data processing system 300. Various applications and services may run in conjunction with the operating system. Instructions for the operating system, applications, and other data are located on storage devices, such as one or more HDD 312, and may be loaded into main memory 304 for execution by the processor(s) 302. In accordance with aspects of the present disclosure, additional instructions or data may be stored on one or more external devices. The processes described herein for the illustrative embodiments may be performed by processor(s) 302 using computer usable program code, which may be located in a memory such as, for example, main memory 304, ROM 326, or in one or more peripheral devices.

Figure 4:
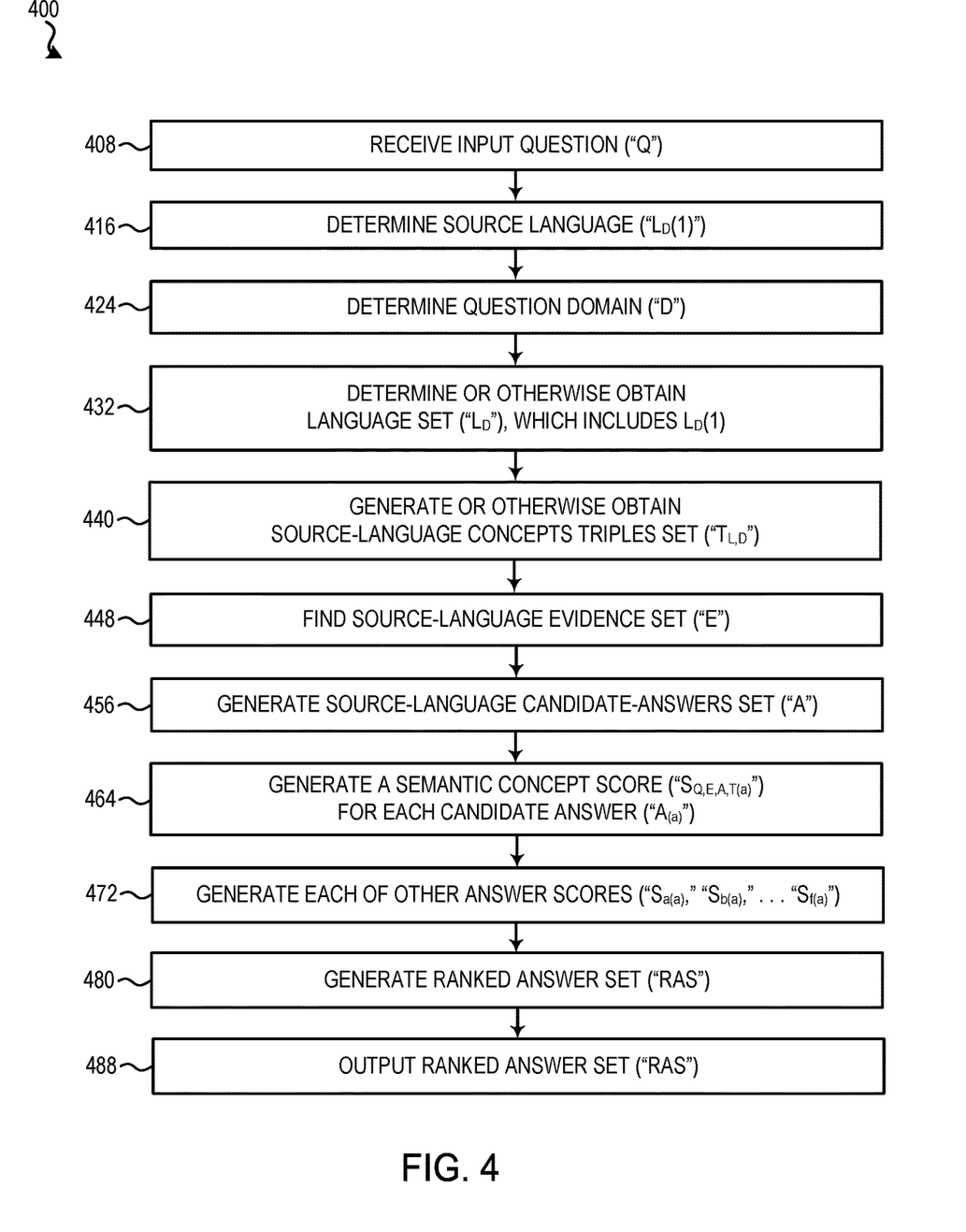
FIG. 4 is a flowchart illustrating a computer-implemented QA method in accordance with aspects of the present disclosure.

FIG. 4 is a flowchart illustrating a computer-implemented QA method 400 in accordance with aspects of the present disclosure. The method 400 may be performed by the QA system 120 (see, e.g., FIG. 1). Accordingly, the description of the method 400 is made with reference to operations and components of the QA system 120, which includes the SCSM 168 (see, e.g., FIG. 1 and FIG. 2). Nevertheless, it should be appreciated that the method 400 and/or any one or more of the particular steps of the method 400 may be performed by any other suitable device or system.

At step 408, the QA system 120 receives the input question 108, Q, from a user and/or from one or more external computers, machines, modules, and/or devices.

At step 416, the QA system 120 uses the QAM 130, the NLTM 112, and/or any other suitable internal and/or external computer(s), machine(s), module(s), and/or device(s) to determine the source language, $L_D(1)$, of the input question 108.

At step 424, the QA system 120 uses the QAM 130, the one or more knowledge-base modules 116, and/or any other suitable internal and/or external computer(s), machine(s), module(s), and/or device(s) to determine the question domain ("D").

At step 432, the QA system 120 uses the SMEMA 216 and/or any other suitable internal and/or external computer(s), machine(s), module(s), and/or device(s) to determine or otherwise obtain the language set, $L_D$, with $L_D$ including the source language, $L_D(1)$.

At step 440, the QA system 120 uses the SMEMB 224 and/or any other suitable internal and/or external computer(s), machine(s), module(s), and/or device(s) to generate or otherwise obtain the concepts triples set, $T_{L,D}$.

At step 448, the QA system 120 uses the CSM 140, the one or more knowledge-base modules 116, and/or any other suitable internal and/or external computer(s), machine(s), module(s), and/or device(s) to find the source-language evidence set, E.

At step 456, the QA system 120 uses the AGM 150 and/or any other suitable internal and/or external computer(s), machine(s), module(s), and/or device(s) to generate the source-language candidate-answers set, A.

At step 464, the QA system 120 uses the SCSM 168 and/or any other suitable internal and/or external computer(s), machine(s), module(s), and/or device(s) to generate, for each candidate answer, $A_{(a)}$, of the source-language candidate-answers set, A, a corresponding semantic concept score, $S_{Q,E,A,T(a)}$. It should be appreciated that where n is the number of candidate answers in A, at step 464 the QA system 120 uses the SCSM 168 and/or any other suitable internal and/or external computer(s), machine(s), module(s), and/or device(s) to generate n corresponding semantic concept scores. For example, when A comprises $A_{(1)}, A(2), \ldots A_{(n)}$, the QA system 120 uses the SCSM 168 and/or any other suitable internal and/or external computer(s), machine(s), module(s), and/or device(s) to generate corresponding $S_{Q,E,A,T(1)}, S_{Q,E,A,T(2)}, \ldots S_{Q,E,A,T(n)}$. A computer-implemented method 500 (see FIG. 5) for generating one or more such semantic concept scores is described below in connection with FIG. 5.

Referring again to FIG. 4, at step 472 the QA system 120 uses the ASM 160 and/or any other suitable internal and/or external computer(s), machine(s), module(s), and/or device(s) to generate the other respective answer scores.

At step 480, the QA system 120 uses the ARM 170 and/or any other suitable internal and/or external computer(s), machine(s), module(s), and/or device(s) to generate the ranked answer set, RAS.

At step 488, the QA system 120 uses the AOM 180 and/or any other suitable internal and/or external computer(s), machine(s), module(s), and/or device(s) to output the ranked answer set, RAS, to a user and/or one or more external computers, machines, modules, and/or devices.

Figure 5:
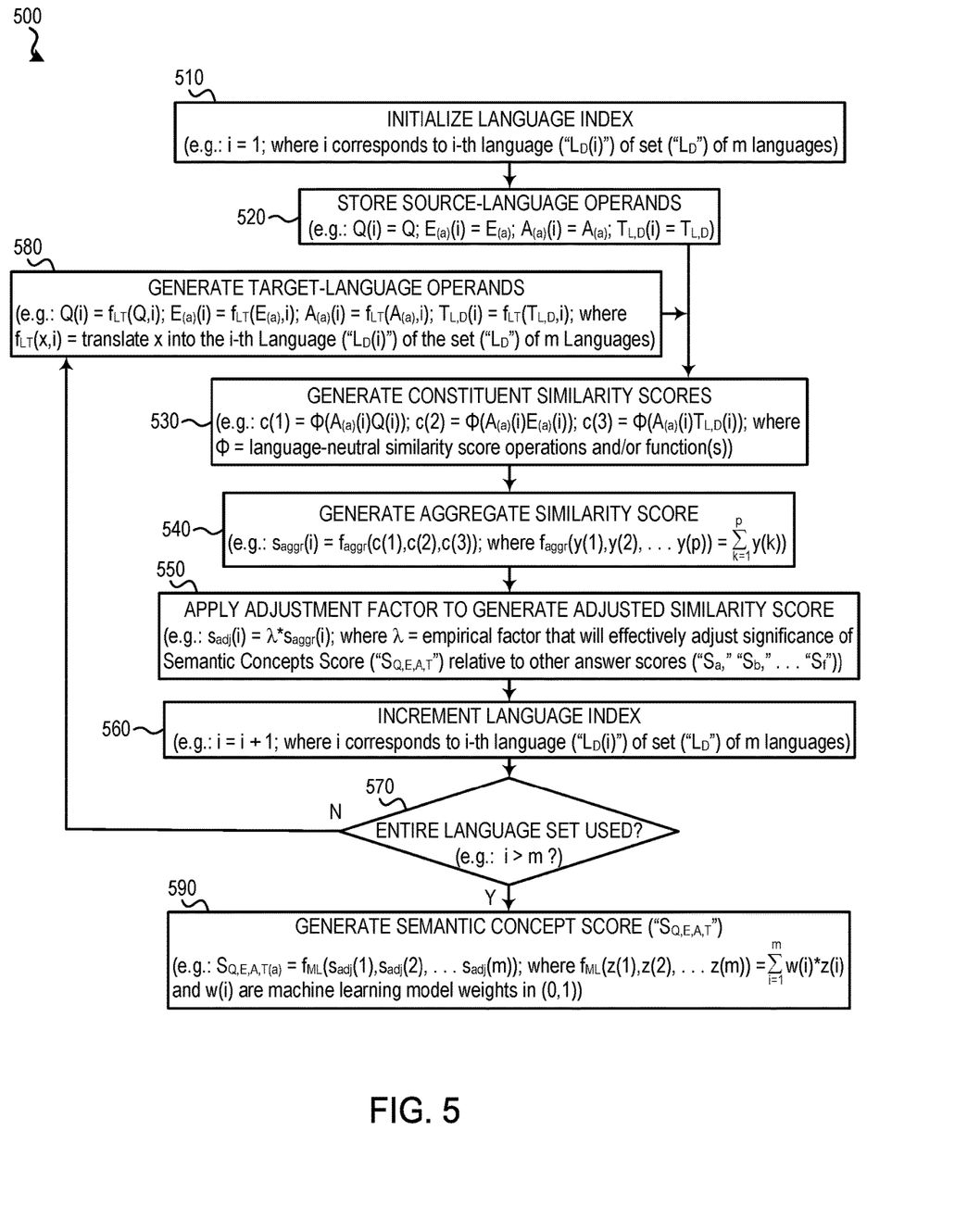
FIG. 5 is a flowchart illustrating a computer-implemented method for generating a semantic concept score in accordance with aspects of the present disclosure.

FIG. 5 is a flowchart illustrating a computer-implemented method 500 for generating a semantic concept score, $S_{Q,E,A,T(a)}$, in accordance with aspects of the present disclosure. The method 500 may be performed by the SCSM 168 (see, e.g., FIG. 2). Accordingly, the description of the method 500 is made with reference to operations and components of the SCSM 168. Nevertheless, it should be appreciated that the method 500 and/or any one or more of the particular steps of the method 500 may be performed by any other suitable device or system. It should also be appreciated that the SCSM 168 and/or any other suitable device or system may perform the method 500 for more than one candidate answer, $A_{(a)}$, of the source-language candidate-answers set, A, in order to generate more than one semantic concept score, $S_{Q,E,A,T(a)}$, with each such semantic concept score, $S_{Q,E,A,T(a)}$, corresponding to each respective candidate answer, $A_{(a)}$. Thus, where n is the number of candidate answers in A, the SCSM 168 and/or any other suitable device or system may repeat the method 500 for a=1 to n (and, ergo, in some embodiments the SCSM 168 and/or any other suitable device or system may perform the method 500n times to thereby generate n corresponding semantic concept scores).

At step 510, the SCSM 168 initializes a language index. For example, the SCSM 168 makes i=1, where i corresponds to i-th language, $L_D(i)$, of the set, $L_D$, of m natural languages.

At step 520, the SCSM 168 stores source-language operands as initial working foundational operands. For example, when i=1 (see, e.g., step 510, described above) the SCSM 168 makes Q(1)=Q, $E_{(a)}(1)=E_{(a)}$, $A_{(a)}(1)=A_{(a)}$, and $T_{L,D}(1)=T_{L,D}$, where Q, $E_{(a)}$, $A_{(a)}$, and $T_{L,D}$ are the source-language operands, and where Q(1), $E_{(a)}(1)$, $A_{(a)}(1)$, and $T_{L,D}(1)$ are the respective corresponding initial working foundational operands.

At step 530, the SCSM 168 uses the CSGM 248 to generate constituent similarity scores based at least in part on the present working foundational operands. For example, the CSGM 248 makes $c(1)=\Phi(A_{(a)}(i)Q(i)$, $c(2)=\Phi(A_{(a)}(i)E_{(a)}(i))$, and $c(3)=\Phi(A_{(a)}(i)T_{L,D}(i)$, where Q(i), $E_{(a)}(i)$, $A_{(a)}(i)$, and $T_{L,D}(i)$ are the present working foundational operands, and where $\Phi$ comprises suitable language-neutral similarity score operations and/or function(s).

At step 540, the SCSM 168 uses the ASGM 256 to generate an aggregate similarity score based at least in part on the constituent similarity scores. For example, the ASGM 256 makes $s_{aggr}(i)=c(1)+c(2)+c(3)$.

At step 550, the SCSM 168 uses the SLRAM 264 to apply an adjustment factor to the aggregate similarity score to generate an adjusted similarity score based at least in part on the adjustment factor and the aggregate similarity score. For example, the SLRAM 264 makes $s_{adj}(i)=\lambda*s_{aggr}(i)$, where $\lambda$ is an empirical factor that will suitably effectively adjust the weight of the $S_{Q,E,A,T(a)}$ relative to the other respective answer scores generated by the ASM 160 at step 472 (FIG. 4) (see also, e.g., FIG. 1 and FIG. 2).

At step 560, the SCSM 168 increments the language index. For example, the SCSM 168 makes i=i+1, where i still corresponds to i-th language, $L_D(i)$, of the set, $L_D$, of m natural languages.

At step 570, the SCSM 168 determines whether all operands corresponding to the entire set, $L_D$, of m natural languages have been used (as working foundational operands) to generate corresponding adjusted similarity scores. For example, the SCSM 168 determines whether i is greater than m. If the SCSM 168 determines that i is not greater than m, then operations of the SCSM 168 go to step 580 (described further below). If the SCSM 168 determines that i is greater than m, then operations of the SCSM 168 go to step 590 (described further below).

At step 580, the SCSM 168 uses the NLTM 112 to generate target-language operands by translating the source-language operands from the source language, $L_D(1)$, into the next (to be applied) natural language of the set, $L_D$, of m natural languages, and the SCSM 168 stores the target-language operands as the respective corresponding new present working foundational operands. For example, the SCSM 168 uses the NLTM 112 to generate Q(i), $E_{(a)}(i)$, $A_{(a)}(i)$, and $T_{L,D}(i)$ such that $Q(i)=f_{LT}(Q,i)$, $E_{(a)}(i)=f_{LT}(E_{(a)},i)$, $A_{(a)}(i)=f_{LT}(A_{(a)},i)$, and $T_{L,D}(i)=f_{LT}(T_{L,D},i)$, where Q, $E_{(a)}$, $A_{(a)}$, and $T_{L,D}$ are the source-language operands, where Q(i), $E_{(a)}(i)$, $A_{(a)}(i)$, and $T_{L,D}(i)$ are the respective corresponding target-language operands (and are the respective corresponding new present working foundational operands), and where $f_{LT}(x,i)$ comprises suitable operations and/or function (s) to translate x into the i-th natural language, $L_D(i)$, of the set, $L_D$, of m natural languages. After step 580, operations of the SCSM 168 go to step 530 (described above).

At step 590, the SCSM 168 uses the SCSMMLM 280 to generate the semantic concept score, $S_{Q,E,A,T(a)}$. For example, the SCSMMLM 280 generates the $S_{Q,E,A,T(a)}$ such that $S_{Q,E,A,T(a)}=f_{ML}(s_{adj}(1),s_{adj}(2), \ldots s_{adj}(m))$, where $f_{ML}(z(1),z(2),\ldots z(m))=\sum_{i=1}^{m} w(i)*z(i)$, where w(i) are machine learning model weights in (0,1), and where i still corresponds to the i-th natural language, $L_D(i)$, of the set, $L_D$, of m natural languages. After step 590, the SCSM 168 performs the method 464 (beginning again at step 510) for the next candidate answer, $A_{(a)}$, of the source-language candidate-answers set, A, unless the SCSM 168 has generated an $S_{Q,E,A,T(a)}$ for each $A_{(a)}$. After the SCSM 168 has generated an $S_{Q,E,A,T(a)}$ for each $A_{(a)}$, operations of the QA system 120 go to step 472 (see, e.g., FIG. 4).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In accordance with aspects of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving an input question in a source language;
   generating a first similarity score based at least in part on a source-language operand, wherein generating the first similarity score includes:
      generating a first constituent similarity score based at least in part on the input question and a corresponding source-language candidate-answers set,
      generating a second constituent similarity score based at least in part on the source-language candidate-answers set and a corresponding source-language evidence set, and
      generating a third constituent similarity score based at least in part on the source-language candidate-answers set and a corresponding source-language concepts-triples set;
   generating a target-language operand based at least in part on the source-language operand;
   generating a second similarity score based at least in part on the target-language operand;
   generating a semantic concept score based at least in part on the first similarity score and the second similarity score;
   generating a set of ranked answers to the input question ("ranked answer set") based at least in part on the semantic concept score; and
   outputting the ranked answer set.

2. The method of claim 1, wherein generating the semantic concept score includes using a machine learning model.

3. The method of claim 2, wherein
   generating the second similarity score includes:
      generating a fourth constituent similarity score based at least in part on a target-language input question and a corresponding target-language candidate-answers set,
      generating a fifth constituent similarity score based at least in part on the target-language candidate-answers set and a corresponding target-language evidence set, and
      generating a sixth constituent similarity score based at least in part on the target-language candidate-answers set and a corresponding target-language concepts-triples set.

4. The method of claim 3, wherein the source-language concepts-triples set includes a source-language subject-verb-object triple, and wherein the target-language concepts-triples set includes a corresponding target-language subject-verb-object triple.

5. The method of claim 4, further comprising generating the source-language concepts-triples set based at least in part on a question domain.

6. The method of claim 5, further comprising determining a target language for the target-language operand based at least in part on the question domain.

7. The method of claim 6, further comprising using at least one structure mapping engine to perform at least one step selected from the group consisting of:
   generating the source-language concepts-triples set and determining the target language.

8. The method of claim 7, wherein generating the first similarity score includes:
   applying an adjustment factor based at least in part on the question domain to the first similarity score, and
   generating the second similarity score includes applying the adjustment factor to the second similarity score.

9. A system, comprising:
   a memory having instructions stored therein; and
   at least one processor in communication with the memory, wherein the at least one processor is configured to execute the instructions to:
      receive an input question in a source language;
      generate a first similarity score based at least in part on a source-language operand, wherein generating the first similarity score includes:
         generating a first constituent similarity score based at least in part on the input question and a corresponding source-language candidate-answers set,
         generating a second constituent similarity score based at least in part on the source-language candidate-answers set and a corresponding source-language evidence set, and
         generating a third constituent similarity score based at least in part on the source-language candidate-answers set and a corresponding source-language concepts-triples set;
      generate a target-language operand based at least in part on the source-language operand;
      generate a second similarity score based at least in part on the target-language operand;
      generate a semantic concept score based at least in part on the first similarity score and the second similarity score;
      generate a set of ranked answers to the input question ("ranked answer set") based at least in part on the semantic concept score; and
      output the ranked answer set.

10. The system of claim 9, wherein the at least one processor is further configured to execute the instructions to:
    generate a fourth constituent similarity score based at least in part on a target-language input question and a corresponding target-language candidate-answers set,
    generate a fifth constituent similarity score based at least in part on the target-language candidate-answers set and a corresponding target-language evidence set,
    generate a sixth constituent similarity score based at least in part on the target-language candidate-answers set and a corresponding target-language concepts-triples set, and generate the second similarity score based at least in part on the fourth constituent similarity score, the fifth constituent similarity score, and the sixth constituent similarity score.

11. The system of claim 10, wherein the source-language concepts-triples set includes a source-language subject-verb-object triple, and wherein the target-language concepts-triples set includes a corresponding target-language subject-verb-object triple.

12. The system of claim 11, wherein the at least one processor is further configured to execute the instructions to generate the source-language concepts-triples set based at least in part on a question domain.

13. The system of claim 12, wherein the at least one processor is further configured to execute the instructions to determine a target language for the target-language operand based at least in part on the question domain.

14. The system of claim 13, wherein the at least one processor is further configured to execute the instructions to:
apply an adjustment factor based at least in part on the question domain to the first similarity score, and
apply the adjustment factor to the second similarity score.

15. A computer program product, the computer program product comprising a computer readable storage medium having program instructions embodied therewith, the program instructions executable by at least one processor to cause the at least one processor to:
receive an input question in a source language;
generate a first similarity score based at least in part on a source-language operand, wherein generating the first similarity score includes:
generating a first constituent similarity score based at least in part on the input question and a corresponding source-language candidate-answers set,
generating a second constituent similarity score based at least in part on the source-language candidate-answers set and a corresponding source-language evidence set, and
generating a third constituent similarity score based at least in part on the source-language candidate-answers set and a corresponding source-language concepts-triples set;
generate a target-language operand based at least in part on the source-language operand;
generate a second similarity score based at least in part on the target-language operand;
generate a semantic concept score based at least in part on the first similarity score and the second similarity score;
generate a set of ranked answers to the input question ("ranked answer set") based at least in part on the semantic concept score; and
output the ranked answer set.

16. The computer program product of claim 15, wherein the program instructions are further executable by the at least one processor to cause the at least one processor to:
generate a fourth constituent similarity score based at least in part on a target-language input question and a corresponding target-language candidate-answers set;
generate a fifth constituent similarity score based at least in part on the target-language candidate-answers set and a corresponding target-language evidence set;
generate a sixth constituent similarity score based at least in part on the target-language candidate-answers set and a corresponding target-language concepts-triples set; and
generate the second similarity score based at least in part on the fourth constituent similarity score, the fifth constituent similarity score, and the sixth constituent similarity score.

17. The computer program product of claim 16, wherein the source-language concepts-triples set includes a source-language subject-verb-object triple, and wherein the target-language concepts-triples set includes a corresponding target-language subject-verb-object triple.

18. The computer program product of claim 17, wherein the program instructions are further executable by the at least one processor to cause the at least one processor to generate the source-language concepts-triples set based at least in part on a question domain.

19. The computer program product of claim 18, wherein the program instructions are further executable by the at least one processor to cause the at least one processor to determine a target language for the target-language operand based at least in part on the question domain.

20. The computer program product of claim 19, wherein the program instructions are further executable by the at least one processor to cause the at least one processor to:
apply an adjustment factor based at least in part on the question domain to the first similarity score; and
apply the adjustment factor to the second similarity score.

* * * * *